Dec. 21, 1965 P. J. ZORENA ETAL 3,225,180
WEIGHT MEASURING AND INDICATING APPARATUS AND METHOD
Filed March 15, 1962 2 Sheets-Sheet 2
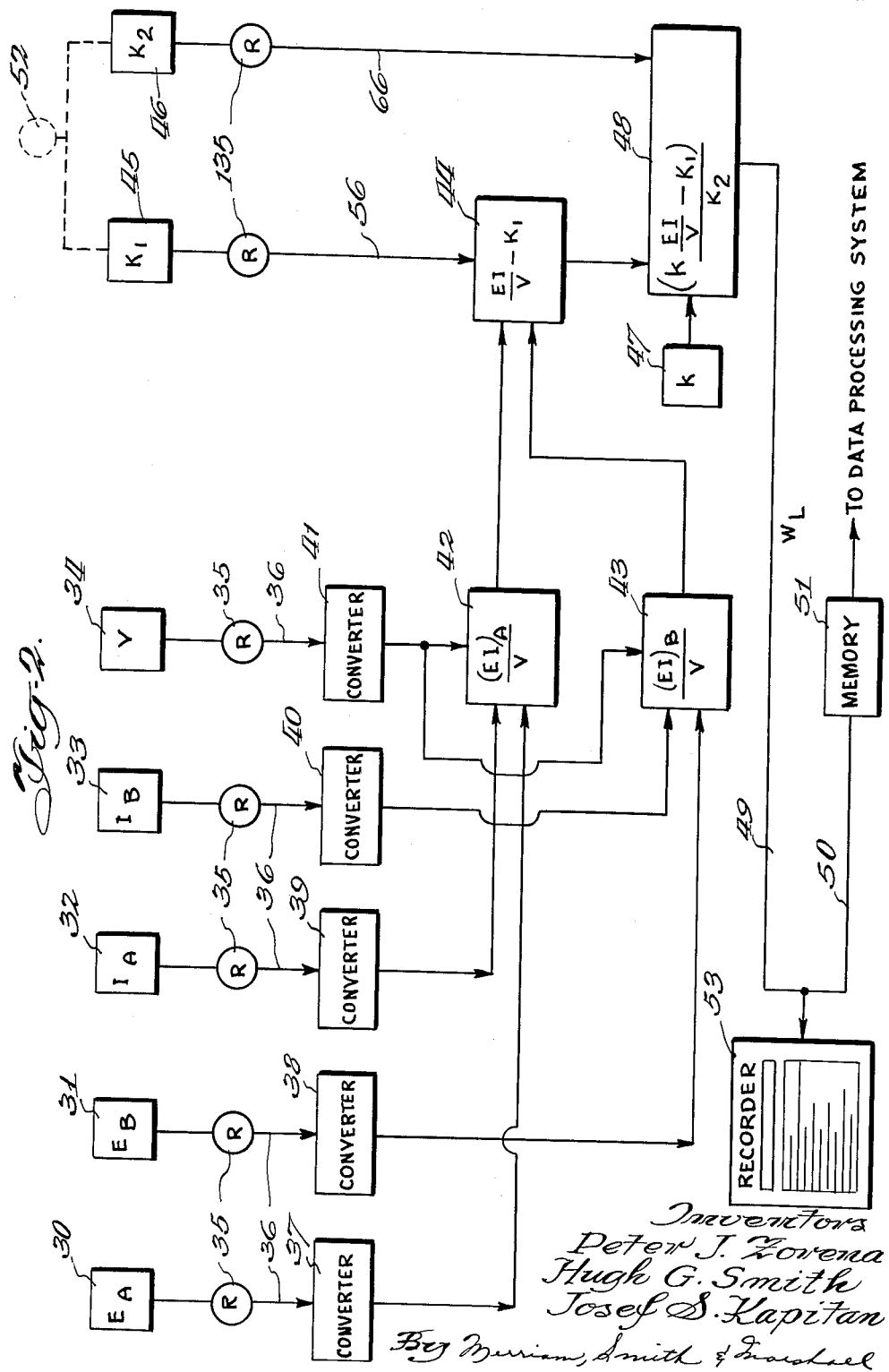

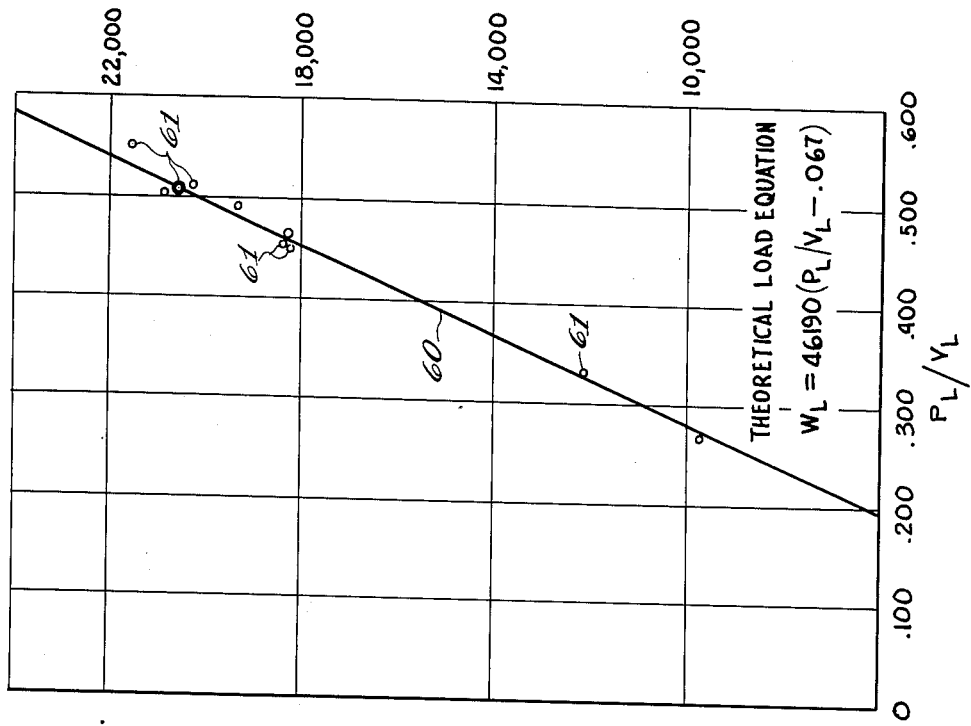
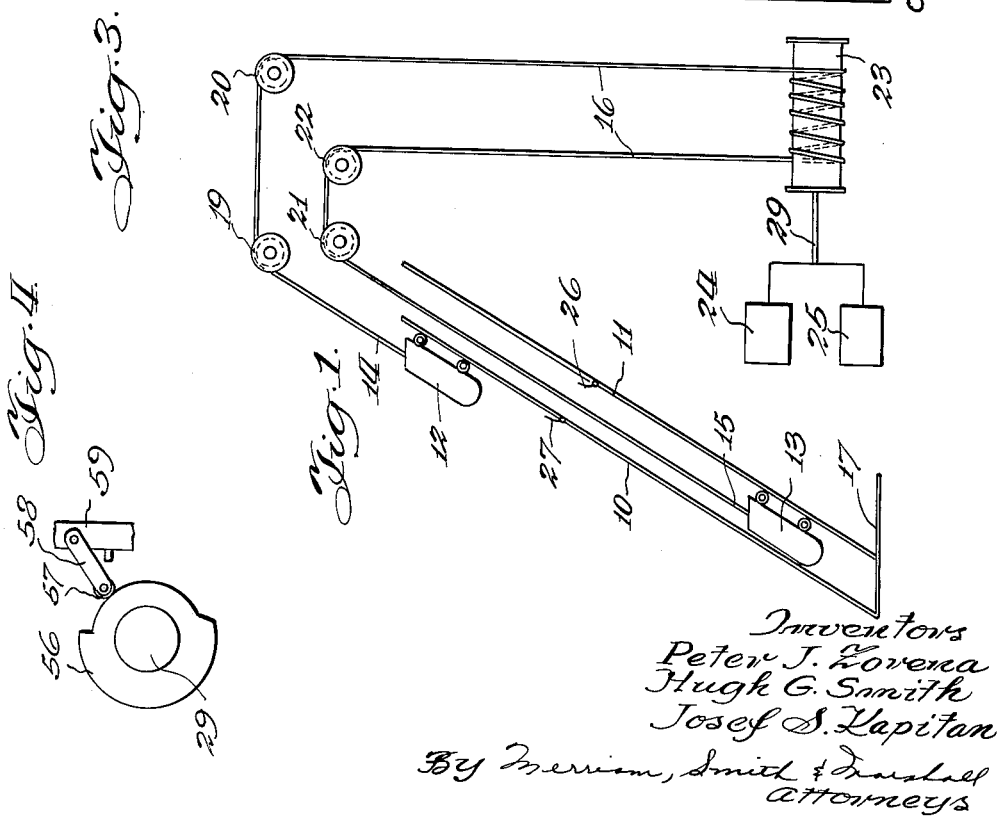

United States Patent Office 3,225,180
Patented Dec. 21, 1965

3,225,180
WEIGHT MEASURING AND INDICATING
APPARATUS AND METHOD
Peter J. Zorena, Hammond, and Hugh G. Smith and Josef S. Kapitan, St. John, Ind., assignors to Inland Steel Company, Chicago, Ill., a corporation of Delaware
Filed Mar. 15, 1962, Ser. No. 179,928
9 Claims. (Cl. 235—151.33)

The present invention relates generally to weight measuring and indicating apparatus and methods and more particularly to apparatus and methods for obtaining the weight of material in a loaded material-transferring car while the car is being hoisted to an elevated position.

In a typical situation, the subject apparatus and methods are used for determining and indicating the weight of a load in material-holding and transferring means such as a blast furnace skip car. These cars are generally loaded on the ground and then hoisted up an inclined ramp to an elevated unloading position near the top of a blast furnace by elevating means such as a cable trained around a revolving drum driven by electric motor means. It has been discovered that if the current and voltage of the motor means and the velocity of the skip car are measured simultaneously while the car is being hoisted to the elevated position and the motor means is operating at a substantially constant speed, then the weight of the load in the car can be determined in accordance with the formula:

$$W_L = \frac{k(P_L/V_L - K_1)}{K_2}$$

where $W_L$ = weight of load in pounds
$k$ = conversion factor for converting kilowatts into foot-pounds per minute = 44,300
$K_1 = P_o/V_o$
$K_2 = \sin\theta + kP_o/2V_oW_o$
$\theta$ = angle of incline of ramp
$W_o$ = weight of empty car in pounds
$P_o$ = total power, in kilowatts, for hoisting empty car $(I_oE_o)$
$V_o$ = velocity of empty skip car, in feet per minute
$P_L$ = total power, in kilowatts, for hoisting loaded car $(I_LE_L) = (IE)_A + (IE)_B$
$V_L$ = velocity of loaded skip car, in feet per minute
$A$ = a first motor for hoisting the loaded car
$B$ = a second motor for hoisting the loaded car.

In accordance with the present invention, there is provided apparatus including means for simultaneously measuring the amperage and voltage of the motor means and the velocity of the skip car and for converting these measurements into an electric signal; means for automatically introducing said signals into a computer when the car is being hoisted to an elevated position and the motor means is operating at a substantially constant speed; and analog computer means for determining the weight of the load in the car in accordance with the above formula.

The apparatus and method of the present invention provide useful information for material accounting purposes; indicate accurately the consumption of material normally not measured by weight or weighed on a scale; and provide a check in situations where the material is normally weighed on a conventional scale.

Once the apparatus is set up, it requires little periodic adjustment, except for a daily calibration involving merely hoisting a few empty cars to the elevated position and turning a single knob to adjust for the day-to-day changes in the friction developed as the car travels up the ramp to the elevated position.

Other features and advantages are inherent in the method and apparatus claimed and disclosed, or will become apparent to those skilled in the art from the following detailed description in conjunction with the accompanying diagrammatic drawings, wherein:

FIGURE 1 is a schematic illustration of a conventional skip-hoisting system;

FIGURE 2 is a block diagram of an embodiment of apparatus constructed in accordance with the present invention;

FIGURE 3 is a graph illustrating the conformity of load weight determined in accordance with the present invention as compared to load weight determined by conventional scale weighing methods; and FIGURE 4 illustrates one embodiment of means for initiating a measurement in accordance with the present invention.

Referring initially to FIGURE 1, there is shown a pair of superimposed inclined ramps or tracks 10, 11 leading from a floor or ground level 17 to an elevated location. Mounted for movement up and down tracks 10, 11 are load-transferring skip cars 12, 13, respectively, each connected to opposite ends 14, 15, respectively, of a cable 16 passing over pulleys 21, 22 and 19, 20, and trained around a revolving drum 23 mounted on a shaft 29 driven by electric motor means 24, 25.

When drum 23 is rotated in a first sense, one of the cars 12, 13 is hoisted up its respective ramp 10, 11 and the other car travels down its respective ramp. The weight of the car travelling downwardly helps to hoist the car moving upwardly. When drum 23 is rotated in a second sense, opposite the first sense, the other of the two material-transferring cars 12, 13 is hoisted up its respective ramp while the first car returns downwardly. It has been discovered that if the amperage and voltage of motor means 24, 25 and the velocity of a car 12 or 13 are measured simultaneously while a car 12, 13 is moving up its respective ramp, and motor means 24, 25 are operating at relatively constant speeds, then the weight of the load in the car can be determined in accordance with the previously noted formula.

Referring now to FIGURE 2, a block diagram of apparatus in accordance with the present invention, the sub-letters A, B correspond to motor means 24, 25 respectively. 30, 31 are voltage-measuring means for motor means 24, 25 respectively; 32, 33 are amperage-measuring means for motor means 24, 25 respectively; and 34 is tachometer means for measuring the velocity of the skip car by obtaining the r.p.m. of the revolving drum shaft 29. A single motor means may be utilized rather than two, or a greater number than two may be utilized if desired. The number of voltage and amperage-measuring means corresponds to the number of motor means.

Measuring means 30 through 34 are of conventional construction and operate simultaneously. Each of the measuring means 30 through 34 also converts its respective measurement into an electric signal which is introduced automatically into analog computer means through lines 36 electrically connected to the measuring means by relays 35 actuated, while a car is moving up a ramp, in one embodiment by a trip switch 26 or 27 (FIGURE 1) located on a ramp in the path of a car. In another embodiment (FIGURE 4), relays 35 may be actuated by conventional cam means 56 connected to drum shaft 29 and cooperating with a cam follower 57 on the arm 58 of a conventional snap-action switch 59. Switches 26, 27 are so located, and cam means 56 is so constructed, that relays 35 are actuated, and the electric signals pass through lines 36, while the car is moving to its elevated position and the motor means are operating at a substantially constant speed. This would be near the end of a cycle for elevating a car.

In the embodiment illustrated in FIGURE 2, the electric signals passing through lines 36 are initially introduced into respective conventional converter means 37–41 which change the signals into millivolt signals of a range within the limits of an analog computing system to which the subject apparatus is connected. The signals from converter means 37 and 39 are fed into conventional multiplier-divider means 42; the signals from converter means 38 and 40 are fed into conventional multiplier-divider means 43; and the signal from converter means 41 is fed into both of the multiplier-divider means 42, 43.

The signal coming out of multiplier-divider means 42 corresponds to $P/V$ for motor means 24; and the signal coming out of multiplier-divider means 43 corresponds to $P/V$ for motor means 25. The signals from both of the multiplier-divider means 42, 43 are fed into a single conventional summer means 44, which gives $P/V$ for both motor means. Also introduced into conventional summer means 44 is a signal from a manually adjustable generating station 45 of conventional construction and adjusted to transmit through a line 56 a millivolt signal corresponding to $K_1$.

The signal from summer means 44 is transmitted to conventional multiplier-divider means 48. Also introduced into conventional multiplier-divider means 48 is a signal from a conventional manually adjustable generating station 47 which is set to transmit a signal corresponding to conversion factor $k$. Additionally introduced into conventional multiplier-divider means 48 through a line 66 is a signal from a manually adjustable generating station 46 which is adjusted to transmit a signal corresponding to $K_2$.

Located in lines 56, 66 between generating station 45 and summer means 44 and between generating station 46 and multiplier-divider means 48, respectively, are relay means 135 which are actuated at the same time as relays 35 connected to measuring means 30–34, and by the same actuating means (e.g. see FIGURE 4). The signal coming out of multiplier-divider means 48 corresponds to $W_L$ and this signal is fed through a line 49 to conventional recorder means 53. If desired, the signal $W_L$ may also be fed through a line 50 connected to line 49 and terminating at conventional memory means 51 connected to a conventional data processing system.

Manually adjustable generating station 47, which generates the signal corresponding to conversion factor $k$, need be adjusted only once and the resulting setting is then locked in place. A dimensional analysis of the equation noted above indicates that this conversion factor should have a value of 44,300, and the generating station 47 is set accordingly.

The values $K_1$ and $K_2$ vary from day to day with changes in the friction conditions on the exposed ramps 10, 11. Accordingly generating stations 45, 46 require daily manual adjustment. The adjustment is made by turning a single knob 52, operably connected to generating station 45, 46, while running an empty car 12 or 13 up its respective inclined ramp 10, 11. Knob 52 is adjusted until the value of $W_L$ equals zero, as indicated on recorder 53.

Because $K_2$ is a function of $K_1(Po/Vo)$, adjustment of generating station 45 requires a simultaneous adjustment of generating station 46. Other values of which $K_2$ is a function are the sine of the angle of the ramp slope, $Wo$ (the empty skip weight), and conversion factor $k$. These values are constant and can be introduced into generating station 46 by making appropriate settings therein and then locking these settings in place.

FIGURE 3 shows the close correspondence between the weight of the loaded car as determined in accordance with the present invention (line 60), and the weight of the loaded car as determined by conventional scale weighing means (points 61). Line 60 corresponds to the equation $W_L = 46,190(P_L/V_L - .067)$, said equation being computed for a system wherein $k=44,300$; $K_2=0.96$; $K_1=.067$ and the angle $\theta$ (the slope of the inclined ramp) $=60°$.

Referring to FIGURE 2, the output of signal generator 47 ($k$) is a millivolt signal proportional to the permanent dial setting of 47, which dial setting is expressed as $$\frac{\text{foot pounds}}{\text{kilowatt minutes}}$$

The output of signal generator 46 ($K_2$) is a millivolt signal which is proportional to the dial setting of 46, which dial setting is dimensionless; and the output of signal generator 45 is a millivolt signal proportional to the dial setting of 45, which dial setting is expressed as $$\frac{\text{kilowatt minutes}}{\text{feet}}$$

The measurements obtained by measuring means 30 and 31 are expressed as volts; the measurements obtained by measuring means 32 and 33 are expressed as amperes; and the measurement obtained by measuring means 34 is expressed as feet per minute. The measurements obtained by measuring means 30–34 are converted, at 37–41, respectively, into millivolt signals, proportional to the respective measurement. The output of multiplier-divider 42 (or of 43) is a millivolt signal proportional to the $$\frac{\text{kilowatt minutes}}{\text{feet}}$$

obtained by multiplying the voltage measured by voltmeter 30 (or 31) times the amperage measured by ammeter 32 (or 33) and dividing by the feet per minute measured by tachometer 34. The inputs to summer 44 are all millivolt signals proportional to $$\frac{\text{kilowatt minutes}}{\text{feet}}$$

The output of summer 44 is a millivolt signal, proportional to $$\frac{\text{kilowatt minutes}}{\text{feet}}$$

obtained by adding the input millivolt signals from 42 and 43 and subtracting the input millivolt signal from 45 ($K_1$), all of said input signals being proportional to $$\frac{\text{kilowatt minutes}}{\text{feet}}$$

The output of 44 is multiplied in multiplier-divider 48 by the millivolt signal from 47 ($k$) which is proportional to $$\frac{\text{foot pounds}}{\text{kilowatt minutes}}$$

The product is a millivolt signal proportional to pounds. This is divided by the millivolt signal from 46 ($K_2$), which is dimensionless, so that the quotient is a millivolt signal proportional to pounds.

There have thus been described methods and apparatus for determining the weight of a load in a material-transferring car while the car is being hoisted to an elevated position, said method comprising simultaneously measuring the voltage and amperage of motor means for hoisting the car to the elevated position and the velocity of the car while the motor means is operating at a substantially constant speed, and introducing the resulting measurements into the equation noted above.

All of the individual elements of the subject apparatus are of conventional construction and, individually, are known to those skilled in the art. The subject apparatus constitutes a combination of these elements for the purpose of measuring and indicating the weight of a load in accordance with the formula noted above.

The foregoing detailed description has been given for clearness of understanding only, and no unnecessary limitations should be understood therefrom, as modifications will be obvious to those skilled in the art.

What is claimed is:

1. In an arrangement including a material-transferring car, cable means for hoisting said car up an inclined ramp to an elevated position, a revolving drum for said cable means, and electric motor means drivingly connected to said drum; the improvement comprising apparatus for measuring and indicating the weight of material in said car, said apparatus comprising:

means for simultaneously measuring the voltage and amperage of said motor means and the velocity of said material-transferring car and for converting the measurements into electric signals in the millivolt range;

computer means;

and means for automatically introducing said electric signals into said computer means while the car is being hoisted to an elevated position and the motor means is operating at a substantially constant speed;

said computer means comprising analog computer means for determining the weight of said load in accordance with the formula:

$$W_L = \frac{k(P_L/V_L - K_1)}{K_2}$$

where $W_L$ = weight of load in pounds
$k$ = conversion factor for converting kilowatts into foot-pounds per minute = 44,300
$K_1 = Po/Vo$
$K_2 =$ sine $\theta + kPo/2VoWo$
$\theta$ = angle of incline of ramp
$Wo$ = weight of empty car in pounds
$Po$ = total power, in kilowatts, for hoisting empty car ($IoEo$)
$Vo$ = velocity of empty material-transferring car, in feet per minute
$P_L$ = total power, in kilowatts, for hoisting loaded car ($I_L E_L$)
$V_L$ = velocity of loaded material-transferring car, in feet per minute.

2. The improvement recited in claim 1 wherein said computer means includes:

calibrating means constituting means for adjusting the value of $K_1$ and $K_2$ while elevating an empty car, until the computer means indicates a reading of zero.

3. In an arrangement including a material-transferring car, cable means for hoisting said car to an elevated position, a revolving drum for said cable means, and electric motor means drivingly connected to said drum; the improvement comprising apparatus for measuring and indicating the weight of material in said car, said apparatus comprising:

means for simultaneously measuring the voltage and amperage of said motor means and the velocity of said material-transferring car, and for converting the measurements into electric signals in the millivolt range;

computer means;

means actuable to introduce said electric signals into said computer means;

and means for automatically actuating said introducing means while the car is being hoisted to said elevated position and the motor means in operating at a substantially constant speed;

said computer means comprising analog computer means for determining the weight of said load in accordance with the formula:

$$W_L = \frac{k(P_L/V_L - K_1)}{K_2}$$

where $W_L$ = weight of load in pounds
$k$ = conversion factor for converting kilowatts into foot-pounds per minute
$K_1 = Po/Vo$
$K_2 =$ sine $\theta + kPo/2VoWo$
$\theta$ = angle of path followed by car while being elevated
$Wo$ = weight of empty car in pounds
$Po$ = total power, in kilowatts, for hoisting empty car ($IoEo$)
$Vo$ = velocity of empty car, in feet per minute
$P_L$ = total power, in kilowatts, for hoisting loaded car ($I_L E_L$)
$V_L$ = velocity of loaded car, in feet per minute.

4. In an arrangement including movable material-holding means, electric motor means, and means connecting said motor means to said material-holding means for moving the material-holding means to an elevated position; the improvement comprising apparatus for measuring and indicating the weight of material in said material-holding means, said apparatus comprising:

means for simultaneously measuring the voltage and amperage of said motor means and the velocity of said material-holding means and for converting the measurements into electric signals in the millivolt range;

computer means;

and means for automatically introducing said electric signals into said computer means while the material-holding means is being hoisted to an elevated position and the motor means is operating at a substantially constant speed;

said computer means comprising analog computer means for determining the weight of said load in accordance with the formula:

$$W_L = \frac{k(P_L/V_L - K_1)}{K_2}$$

where $W_L$ = weight of load in pounds
$k$ = conversion factor for converting kilowatts into foot-pounds per minute
$K_1 = Po/Vo$
$K_2 =$ sine $\theta + kPo/2VoWo$
$\theta$ = angle of path followed by material-holding means while being elevated
$Wo$ = weight of empty material-holding means in pounds
$P_L$ = total power, in kilowatts, for hoisting loaded material-holding means ($IoEo$)
$Vo$ = velocity of empty material-holding means, in feet per minute
$P_L$ = total power, in kilowatts, for hoisting loaded material-holding means ($I_L E_L$)
$V_L$ = velocity of loaded material-holding means, in feet per minute.

5. The improvement recited in claim 4 wherein said computer means includes:

calibrating means constituting means for adjusting the value of $K_1$ and $K_2$ while elevating empty material-holding means, until the computer means indicates a reading of zero.

6. A method for obtaining the weight of a load in material-holding means while the latter is being moved to an elevated position by elevating means driven by electric motor means, said method comprising the steps of:

moving said material-holding means to said elevated position by operating said electric motor means;

operating said electric motor means at a substantially constant speed;

simultaneously measuring the voltage and amperage of said electric motor means and the velocity of said material-holding means while the latter is being moved to its elevated position, and converting the measurements thus obtained into electric signals;

performing said measuring while said electric motor means is operating at said substantially constant speed;

and introducing said electric signals into computer means for determining said load weight in accordance with the formula:

$$W_L = \frac{k(P_L/V_L - K_1)}{K_2}$$

where $W_L$ = weight of load in pounds
$k$ = conversion factor for converting kilowatts into foot-pounds per minute = 44,300
$K_1 = Po/Vo$
$K_2 = \text{sine } \theta + kPo/2VoWo$
$\theta$ = angle of path travelled by load moving to elevated position
$Wo$ = weight of empty material-holding means in pounds
$Po$ = total power, in kilowatts, for elevating empty material-holding means ($IoEo$)
$Vo$ = velocity of empty material-holding means, in feet per minute
$P_L$ = total power, in kilowatts, for elevating the loaded material-holding means
$V_L$ = velocity of load material-holding means, in feet per minute.

7. A method as recited in claim 6 and comprising: calibrating said computer means by elevating empty material-holding means and adjusting the value of $K_1$ and $K_2$ until the computer means indicates a reading of zero.

8. A method for obtaining the weight of a load in material-holding means while the latter is being moved to an elevated position by elevating means driven by electric motor means, said method comprising the steps of:

moving said material-holding means to said elevated position by operating said electric motor means;
operating said electric motor means at a substantially constant speed;
simultaneously measuring the voltage and amperage of said electric motor means and the velocity of said material-holding means while the latter is being moved to its elevated position;
performing said measuring while said electric motor means is operating at said substantially constant speed;
and then introducing said measurements into computing means for determining said load weight in accordance with the formula:

$$W_L = \frac{k(P_L/V_L - K_1)}{K_2}$$

where $W_L$ = weight of load in pounds
$k$ = conversion factor for converting kilowatts into foot-pounds per minute = 44,300
$K_1 = Po/Vo$
$K_2 = \text{sine } \theta + kPo/2VoWo$
$\theta$ = angle of path travelled by load moving to elevated position
$Wo$ = weight of empty material-holding means in pounds
$Po$ = total power, in kilowatts, for elevating empty material-holding means ($IoEo$)
$Vo$ = velocity of empty material-holding means, in feet per minute
$P_L$ = total power, in kilowatts, for elevating the loaded material-holding means
$V_L$ = velocity of loaded material-holding means, in feet per minute.

9. A method for measuring and indicating the weight of a load in a material-transferring car while the car is being hoisted up an inclined ramp to an elevated position by a cable trained around a revolving drum powered by electric motor means, said method comprising the steps of:

hoisting said car to said elevated position by operating said electric motor means;
operating said electric motor means at a substantially constant speed;
simultaneously measuring the voltage and amperage of said electric motor means and the velocity of said car while the car is being hoisted, and converting the measurements thus obtained into electric signals;
performing said measuring while said electric motor means is operating at said substantially constant speed;
and introducing said electric signals into analog computer means for determining said load weight in accordance with the formula:

$$W_L = \frac{k(P_L/V_L - K_1)}{K_2}$$

where $W_L$ = weight of load in pounds
$k$ = conversion factor for converting kilowatts into foot-pounds per minute
$K_1 = Po/Vo$
$K_2 = \text{sine } \theta + kPo/2VoWo$
$\theta$ = angle of incline of ramp
$Wo$ = weight of empty car in pounds
$Po$ = total power, in kilowatts, for hoisting the empty car ($IoEo$)
$Vo$ = velocity of empty car, in feet per minute
$P_L$ = total power, in kilowatts, for hoisting the loaded car ($I_L E_L$)
$V_L$ = velocity of loaded car, in feet per minute.

No references cited.

MALCOLM A. MORRISON, *Primary Examiner.*

UNITED STATES PATENT OFFICE
CERTIFICATE OF CORRECTION

Patent No. 3,225,180  December 21, 1965

Peter J. Zorena et al.

It is hereby certified that error appears in the above numbered patent requiring correction and that the said Letters Patent should read as corrected below.

Column 5, line 64, for "in operating" read -- is operating --; lines 70 to 73, the formula should appear as shown below instead of as in the patent:

$$W_L = \frac{k(P_L/V_L - K_1)}{K_2}$$

column 6, line 46, for "$P_L$" read -- Po --; same line 46, for "loaded" read -- empty --; column 7, line 22, for "load" read -- loaded --.

Signed and sealed this 27th day of December 1966.

(SEAL)
Attest:

ERNEST W. SWIDER  
Attesting Officer

EDWARD J. BRENNER  
Commissioner of Patents